US007427044B2

(12) United States Patent
Takamatsu

(10) Patent No.: US 7,427,044 B2

(45) Date of Patent: Sep. 23, 2008

(54) WEBBING RETRACTOR

(75) Inventor: Hitoshi Takamatsu, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 458 days.

(21) Appl. No.: 11/098,383

(22) Filed: Apr. 5, 2005

(65) Prior Publication Data

US 2005/0224620 A1 Oct. 13, 2005

(30) Foreign Application Priority Data

Apr. 9, 2004 (JP) ............................ 2004-115209

(51) Int. Cl.
*B60R 22/28* (2006.01)
*B60R 22/36* (2006.01)
*B60R 22/46* (2006.01)

(52) U.S. Cl. .................... 242/374; 242/379.1; 242/382

(58) Field of Classification Search ................ 242/374, 242/379.1, 383.4, 383.5, 384.2, 384.5, 384.6, 242/382; 280/805, 806, 807; 297/472, 476, 297/477, 478

See application file for complete search history.

(56) References Cited

U.S. PATENT DOCUMENTS 4,312,521 A * 1/1982 Thomas et al. .............. 280/806
4,423,846 A * 1/1984 Fohl ........................... 242/374
4,555,074 A * 11/1985 Kawai et al. ............. 242/379.1
5,014,926 A * 5/1991 Rumpf et al. ............ 242/383.4
5,344,095 A * 9/1994 Frei ........................... 242/374
5,526,996 A * 6/1996 Ebner et al. ................. 242/374
5,529,258 A * 6/1996 Dybro et al. ................ 242/374
5,624,083 A * 4/1997 Modinger et al. ........... 242/374
5,788,176 A * 8/1998 Ebner et al. ................. 242/374
6,241,173 B1 * 6/2001 Wier .......................... 242/382
6,264,127 B1 * 7/2001 Blackadder et al. ...... 242/379.1
6,443,382 B1 * 9/2002 Bae ......................... 242/382.6
6,454,199 B1 * 9/2002 Hori et al. ................... 242/374
6,609,672 B2 * 8/2003 Bell et al. ................... 242/376

FOREIGN PATENT DOCUMENTS

JP 2003-509287 3/2003
WO WO 01/21457 A1 3/2001

* cited by examiner

*Primary Examiner*—Peter M. Cuomo
*Assistant Examiner*—Scott Haugland
(74) *Attorney, Agent, or Firm*—Roberts Mlotkowski Safran & Cole, P.C.; Thomas W. Cole

(57) ABSTRACT

In the webbing retractor, a lock plate is supported by a circular axis so as to be circularly movable freely by a resin support portion of a gear case by insertion of the circular axis of the lock plate in a support hole of the gear case. Even at times when great load acts on the lock plate at the support portion side, deformation of the support portion caused by movement towards the support portion side of the lock plate is prevented due to the tip of the circular axis of the lock plate contacting the metal blocking portion of the cover plate. Due to this, release of the support of the lock plate by the support portion is prevented.

15 Claims, 2 Drawing Sheets

74 58 60 64 62 76 ONE SIDE 14 12 72 68 70 66 ANOTHER SIDE

ANOTHER SIDE
ONE SIDE
10
12
14
16
18
20
22
24
26
28
30
32
34
36
38
40
42
44
46
48
50
52
54
56
58
60
62
64
66
68
70
72
74
76

14
12
ANOTHER SIDE
66
70
72
68
62
64
58
60
ONE SIDE
74
76

WEBBING RETRACTOR

CROSS-REFERENCE TO RELATED APPLICATION

This application claims priority under 35 U.S.C. 119 from Japanese Patent Application No. 2004-115209, the disclosure of which is incorporated by reference herein.

BACKGROUND OF THE INVENTION

1. Field of the Invention

The present invention relates to a webbing retractor in which a rotating component rotates with at least one of the taking up and pulling out of webbing.

2. Description of the Related Art

As a webbing retractor, there is a device where the rotation of a lock gear is blocked by a lock plate meshing with the lock gear that is rotated with the pulling out of a webbing whereby pulling out of the webbing is blocked (e.g., refer to Japanese National Publication No. 2003-509287).

With this type of webbing retractor, the lock plate is retained so as to be able to rotate by a retaining component and is able to rotate between a non-meshing position, where it cannot mesh with the lock gear, and a meshing position, where it can mesh with the lock gear.

However, with this webbing retractor, elastic movement of the lock plate is possible and in order to make the lock plate so as to be able to absolutely mesh with the lock gear, the retaining component is made from a resin. For this reason, the retaining component is easily deformed when a load acts upon it. Therefore, there is a need for a device where deformation of the retaining component (including breakage) due to movement of the lock plate can be blocked and release of the retention of the lock plate due to the retaining component can be prevented, even when a great load acts upon the retaining component side at the lock plate.

SUMMARY OF THE INVENTION

The present invention has been made in view of the above circumstances and provides a webbing retractor that can prevent release of the retention of an engaging component with a retaining component.

The webbing retractor of the first aspect of the present invention is equipped with a rotating component that rotates with at least one of the taking up and pulling out of a webbing; an engaging component that blocks rotation of the rotating component by engaging the rotating component; a retaining component that retains the engaging component in a movable state; and a blocking component that blocks deformation of the retaining component due to movement of the engaging component towards the retaining component side.

The feature of the webbing retractor of the second aspect of the present invention is that, in the webbing retractor of the first aspect, the strength of the blocking component is greater than the strength of the retaining component.

The feature of the webbing retractor of the third aspect of the present invention is that, in the webbing retractors of the first and second embodiments, the retaining component is elastically deformable and the blocking component blocks bending of the retaining component in a direction substantially perpendicular to the movement direction of the engaging component when the engaging component engages the rotating component.

In the webbing retractor of the first aspect, the retaining component retains the engaging component in a movable state. The engaging component engages the rotating component that rotates with at least one of the taking up and pulling out of the webbing, whereby rotation of the rotating component is blocked and at least one of the taking up and pulling out of the webbing is blocked.

Here, deformation of the retaining component due to movement of the engaging component towards the retaining component side is blocked by the blocking component. Due to this, release of the retention of the engaging component by the retaining component can be prevented.

In the webbing retractor of the second aspect of the present invention, the strength of the blocking component is greater than the strength of the retaining component. For this reason, deformation of the retaining component due to movement of the engaging portion towards the retaining portion side can be prevented well by the blocking component, and release of the retention of the engaging component can be well prevented by the retaining component.

In the webbing retractor of the third aspect of the present invention, since the blocking component blocks the retaining component from bending in the direction approximately perpendicular to the movement direction of the engaging component when the engaging component engages the rotating component, the blocking component can take a wide contact area of the engaging component and retaining component, thus making it able to receive a high load.

DETAILED DESCRIPTION OF THE INVENTION

Figure 1:
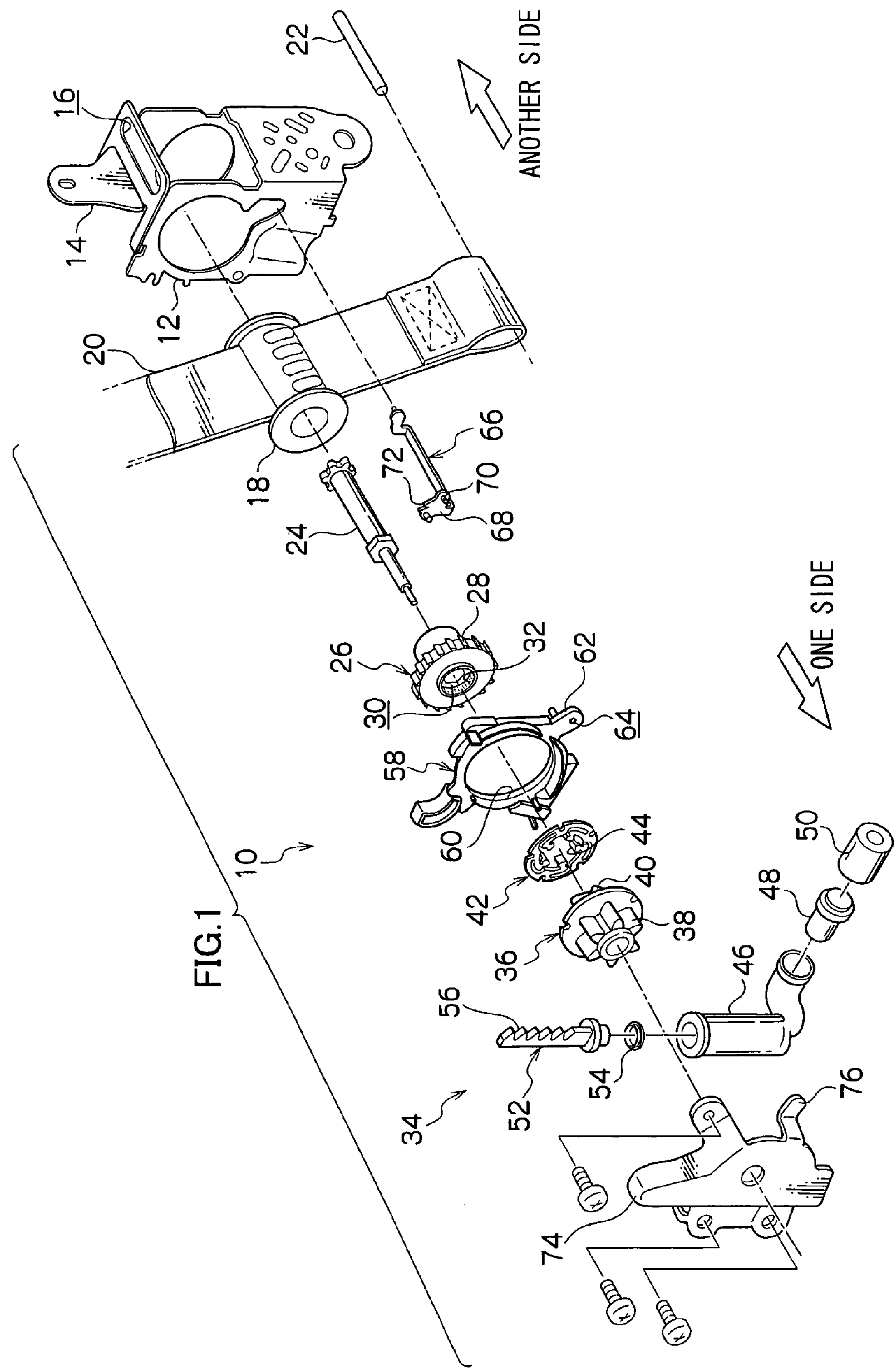
FIG. 1 is an exploded perspective view showing the primary portions of the webbing retractor of an embodiment of the present invention as seen from one side from an upper incline.

An exploded perspective view showing the primary portions of the webbing retractor 10 of an embodiment of the present invention as seen from one side from an upper incline is shown in FIG. 1.

The webbing retractor 10 of the present embodiment is provided with a metal frame 12 that appears as a U-shaped plate from a view of the upper surface, and the frame 12 is fixed in the interior of a vehicle. A connecting piece 14 spans between one side wall of the upper end and another side wall of the upper end of the frame 12, and the connecting piece 14 is fixed in the interior of the vehicle and an insertion hole 16 is formed.

A spool 18 (take-up axis) comprising a force-limiter mechanism is supported so as to be able to rotate freely between one side wall and another side wall of the frame 12. A long strip-shaped webbing 20 is taken up on the spool 18 and a column-shaped shaft 22 set at the base end of the webbing 20 is latched to the spool 18 while the base end vicinity is inserted into the spool 18 and latched to the spool 18. Further, the webbing 20 is inserted into the insertion hole 16 in the vicinity of the portion taken up on the spool 18 and the webbing 20 is worn by the passenger of the vehicle. The webbing 20 is taken up by rotation of the spool 18 in the take-up direction or pulled out by rotation in the pull-out direction.

A torsion shaft 24 (energy absorption component) comprising the force-limiter mechanism is arranged at the central axis portion of the spool 18. The torsion shaft 24 is made to be able to deform in a twisted manner by the application of twisted load exceeding a predetermined load. The end of the other side of the torsion shaft 24 is latched to the end of the other side of the spool 18 and the torsion shaft 24 rotates uniformly with the spool 18.

On one side of the spool 18, a lock gear 26 is set as a rotating component comprising the force limiter. The lock gear 26 is latched to the vicinity of one side end of the torsion shaft 24. The lock gear 26 rotates uniformly with the torsion shaft 24 and the spool 18 with the exception of times where the torsion shaft 24 deforms in a twisted manner.

Ratchet teeth 28 are formed at the outer periphery of the lock gear 26. Further, a substantially column-shaped knurl hole 30 is formed in the center of the lock gear 26. The knurl hole 30 opens to one side, and a knurl surface 32 is formed by performing knurl processing on the entire outer periphery of the knurl hole 30.

A pretensioner mechanism 34 is set at the outer side of one side wall of the frame 12. The pretensioner mechanism 34 has a pinion 36 that is arranged at one side of the lock gear 26 and is supported so as to be able to rotate freely with the torsion shaft 24. Pinion teeth 38 are formed on a portion of one side of the pinion 36. Meanwhile, a cam 40 is formed on a portion of the other side of the pinion 36 and contours are alternately formed at the outer periphery of the cam 40. The cam 40 is inserted into the knurl hole 30 while remaining out of contact with the knurl surface 32, and the lock gear 26 is independent of the pinion 36 and made to be rotatable.

The pretensioner mechanism 34 has a clutch plate 42 that is arranged between the lock gear 26 and the pinion 36. Multiple mesh claws 44 are formed in the center of the clutch plate 42 and each mesh claw 44 protrudes towards the other side of the clutch plate 42. Each mesh claw 44 matches with each indented portion of the cam 40 and due to this, the clutch plate 42 is fixed to the pinion 36. Each mesh claw 44 is inserted into the interior of the knurl hole 30 with the cam 40 while remaining out of contact with the knurl surface 32 and the lock gear 26 is independent of the clutch plate 42 and made to be rotatable.

The pretensioner mechanism 34 has an approximately L-shaped cylindrical cylinder 46. The cylinder 46 is fixed to the outer side of one side wall of the frame 12 beneath the lower direction of the pinion 36. A gas generator 48 is set at the lower side end of the cylinder 46 and a cylindrical generator cap 50 having a bottom is fixed therewith. The gas generator 48, in a state where the generator cap 50 covers it, blocks the lower side end of the cylinder 46.

The pretensioner mechanism 34 has a piston 52 that is inserted into the interior of the cylinder 46 from the upper end thereof. An O-ring 54 is set at the lower end of the piston 52. The O-ring 54 forms a seal between the lower end of the piston 52 and the cylinder 46. Further, a rack 56 is formed on the piston 52 except for at the position of the lower end.

Figure 2:
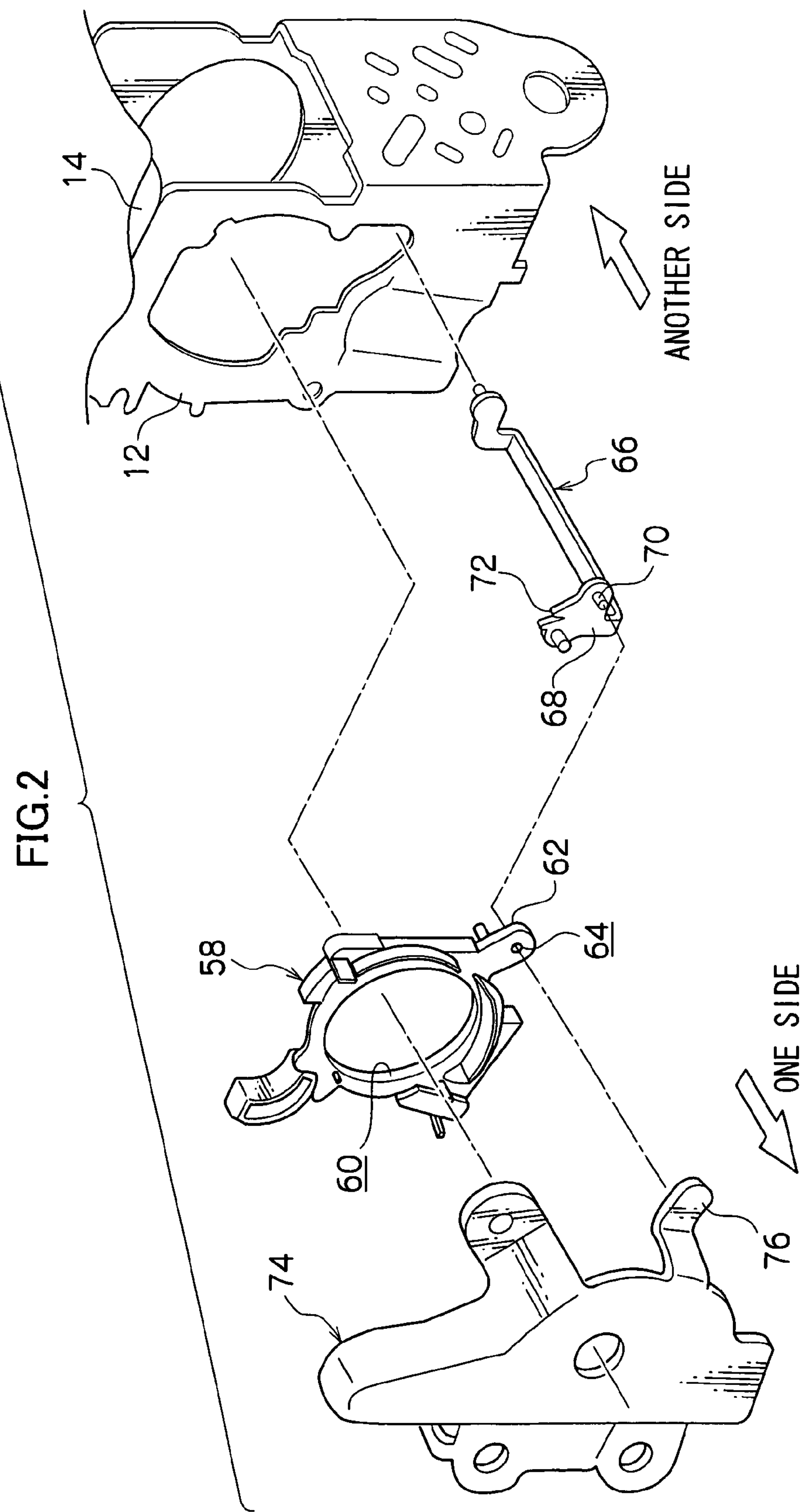
FIG. 2 is an exploded perspective view showing details of the special portions in the webbing retractor of an embodiment of the present invention as seen from one side from an upper incline.

As shown in FIG. 2, a resin gear case 58 is set as a retaining component between one side wall of the frame 12 and the pretensioner mechanism 34, and the gear case 58 covers one side of the lock gear 26. A circular through-hole 60 is formed in the center of the gear case 58, and the through-hole 60 exposes the knurl hole 30 of the lock gear 26. A substantially board-shaped support portion 62 (retaining portion) is formed uniformly at the diagonal lower portion of the gear case 58 and a circular support hole 64 (retaining hole) is formed so as to pass through the support portion 62.

A lock component 66 spans between one side wall and the other side wall of the frame 12. The lock component 66 is blocked from moving towards the other side by the other side wall of the frame 12.

A planar lock plate 68 is uniformly formed as an engaging component at one side end of the lock component 66. The lock plate 68 is arranged at the diagonal lower direction of the lock gear 26. A circular axial rotating axis 70 is uniformly formed at one end of the lock plate 68. The rotating axis 70 is inserted into the support hole 64 of the gear case 58, whereby the lock plate 68 is supported (retained) at the rotating axis 70 so as to be able to rotate (move) freely in the support portion 62 of the gear case 58. A lock tooth 72 is formed at the other end of the lock plate 68. The lock plate 68 is arranged at a non-meshing position (disengaged position) on the opposite side of the lock gear 26. The lock tooth 72 is made to be in a non-meshing state (disengaged state) where it cannot mesh (engage) with the ratchet teeth 28 of the lock gear 26.

A substantially triangular container-like cover plate 74 of metal (covering component) is fixed to the outer side of one side wall of the frame 12. The cover plate 74 is open at the other side surface and the lower surface. One side end of the torsion shaft 24 is inserted through the cover plate 74 in the lower portion. The cover plate 74 supports the torsion shaft 24 so as to be able to rotate freely while accommodating the pinion 36, the clutch plate 42, and the upper portion of the piston 52 in its interior. Further, the cover plate 74 clamps (retains) the gear case 58 between one side wall of the frame 12 except in the area of the support portion 62.

A planar blocking portion 76 (latching portion) is uniformly formed as a blocking component at the diagonal lower portion of the cover plate 74. The blocking portion 76 is arranged at one side of the support portion 62 of the gear case 58. When the lock component 66 (lock plate 68) is moved towards one side, the blocking portion 76 latches movement of the lock component 66 (lock plate 68) towards one side by coming into contact with the tip (one side end) of the rotating axis 70 of the lock plate 68, and blocks deformation towards one side with the lock plate 68 of the support portion 62 of the gear case 58.

Next, the operation of the present embodiment will be explained.

With the webbing retractor 10 configured as described above, the pretensioner mechanism 34 operates at a time of emergency for the vehicle (e.g., at the time of rapid deceleration) and the piston 52 is raised inside the cylinder 46 with the O-ring 54 due to the generation of gas by the gas generator 48, and the rack 56 of the piston 52 meshes with the pinion teeth 38 of the pinion 36 and the pinion 36 rotates in the take-up direction. For this reason, the pinion 36 undergoes comparative rotation relative to the clutch plate 42 and by each mesh claw 44 of the clutch plate 42 matching up with each convex portion of the cam 40 of the pinion 36, each mesh claw 44 of the clutch plate 42 is moved towards the outer side in the radial direction of the clutch plate 42, thereby meshing with the knurl surface 32 of the lock gear 26. Due to this, the clutch plate 42 and lock gear 26 are rotated uniformly with the pinion 36 in the take-up direction, whereby the torsion shaft 24 and spool 18 are rotated uniformly with the lock gear 26 in the take-up direction and the webbing 20 is taken up.

Moreover, at times of rapid deceleration of the vehicle or when pull-out acceleration greater than a predetermined acceleration is detected, the lock plate 68 of the lock component 66 is rotated towards a meshing enabled position (engaging enabled position) on the lock gear 26 side, whereby the lock plate 68 changes from where the lock tooth 72 does not mesh with the ratchet teeth 28 of the lock gear 26 to which rotating force was applied in the take-up direction to a meshing enabled state (engaging enabled state) where the lock tooth 72 meshes with the ratchet teeth 28 of the lock gear 26 to which rotating force was applied in the pull-out direction. Due to this, pull-out load from the passenger is applied to the webbing 20 and rotation force is provided to the spool 18, torsion shaft 24, and lock gear 26 in the pull-out direction, whereby the lock tooth 72 meshes with the ratchet teeth 28 and rotation of the lock gear 26 in the pull out direction is blocked, and pulling out of the webbing 20 is blocked.

Furthermore, when rotating of the lock gear 26 in the pull-out direction is blocked in this manner by the lock plate 68 after pulling out of the webbing 20 is blocked and twisted load that exceeds a predetermined load is applied to the torsion shaft 24 (especially after the operation of the pretensioner mechanism 34) the pretensioner mechanism is operated and the torsion shaft 24 undergoes twisted deformation; whereby the spool 18 is rotated in the pull-out direction independently of the lock gear 26. Due to this, the webbing 20 is pulled out and the load (energy) from the webbing 20 that acts upon the passenger is absorbed.

It should be noted that due to the rotating axis 70 of the lock plate 68 being inserted into the support hole 64 of the gear case 58, the lock plate 68 is supported so as to be able to rotate freely by the support portion 62 of the gear case 58 at the rotating axis 70.

Further, since the gear case 58 (support portion 62) is made from resin, the lock plate 68 can elastically move due to elastic deformation of the support portion 62. Due to this, the lock tooth 72 of the lock plate 68 can absolutely mesh with the ratchet teeth 28 of the lock gear 26 to which rotating force was applied in the pull-out direction.

Here, due to the meshing with the lock gear 26 of the lock plate 68 and the like, even when great load acts upon one side (the support portion 62 side) at the lock plate 68, the tip of the rotating axis 70 of the lock plate 68 comes into contact with the blocking portion 76 of the cover plate 74, whereby deformation (including damage) towards one side of the support portion 62 due to movement towards one side of the lock plate 68 is blocked. Due to this, release of the support (i.e., the insertion of the rotating axis 70 in the support hole 64) of the lock plate 68 by the support portion 62 can be prevented.

Furthermore, although the gear case 58 (support portion 62) is made from resin, the cover plate 74 (blocking portion 76) is made of metal so the strength of blocking portion 76 is made greater than the strength of the support portion 62. For this reason, deformation towards one side of the support portion 62 due to movement towards one side of the lock plate 68 can be blocked well by the blocking portion 76, and release of the support of the lock plate 68 by the support portion 62 can be well prevented.

On top of that, since the blocking portion 76 blocks the support portion 62 from bending in the direction approximately perpendicular to the movement direction of the lock plate 68 when the lock tooth 72 of the lock plate 68 meshes with the ratchet teeth 28 of the lock gear 26, the blocking portion 76 can take a wide contact area of the rotating axis 70 of the lock plate 68 as well as that of the support portion 62, thus being able to receive a high load.

Further, the blocking portion 76 is uniformly set with the cover plate 74 so an increase in the number of parts can be prevented.

With the present embodiment is configured so that the tip of the rotating axis 70 of the lock plate 68 comes into contact with the blocking portion 76 of the cover plate 74, thereby blocking deformation towards one side of the support portion 62 due to movement of the lock plate 68 towards one side. However, it can also be configured to block deformation towards one side of the support portion 62 by movement towards one side of the lock plate 68 due to the support portion 62 coming into contact with the blocking portion 76.

Further, the present embodiment is configured such that the blocking portion 76 is set uniformly with the cover plate 74, however, it can also be configured so that the blocking portion 76 is uniformly set at another position (e.g., the frame 12).

In addition, the lock plate 68 is provided wit the rotating axis 70 and the lock plate is retained at the engaging component so as to be able to rotate around the rotating axis 70, the stucture has a higher strength rather than a case in which a resin pin is used in place of the rotating axis.

What is claimed is:

1. A webbing retractor comprising:

a metal lock gear having teeth that rotates with at least one of the taking up and pulling out of a webbing;

a metal lock plate that blocks rotation of the metal lock gear by engaging and meshing with the teeth of the metal lock gear;

a retaining component formed from a deformable plastic material that retains the metal lock plate in a movable state; and a blocking component that blocks deformation of the retaining component due to movement of the metal lock plate towards a retaining component side, wherein the strength of the blocking component is greater than the strength of the retaining component, and wherein the retaining component is elastically deformable and the blocking component blocks bending of the retaining component in a direction substantially perpendicular to the movement direction of the metal lock gear when the teeth of the metal lock plate engage and mesh with the rotating component, and wherein a circular rotating axis is uniformly formed at one end of the lock plate and the rotating axis is inserted into a support hole of the retaining component, whereby the lock plate is supported at the rotating axis so as to be able to rotate in the retaining component.

2. The webbing retractor of claim 1, further comprising a spool constituting a force limiter mechanism supported so as to be able to rotate freely between opposing side walls of a frame, wherein a long strip-shaped webbing is taken up on the spool and a column-shaped shaft set at the base end of the webbing is latched to the spool and the base end vicinity is inserted in the spool and latched thereto.

3. The webbing retractor of claim 2, further comprising a torsion shaft that is arranged in the central axis portion of the spool and which constitutes said force limiter mechanism and the torsion shaft is twistedly deformable by the application of twisting load exceeding a predetermined load, wherein a side end of the torsion shaft is latched to an end of the spool and the torsion shaft rotates with the spool.

4. The webbing retractor of claim 3, wherein the metal lock gear is set at one side of the spool.

5. The webbing retractor of claim 4, wherein the lock gear constitutes a force limiter and is latched to the vicinity of one side end of the torsion shaft and, with the exception of times where the torsion shaft undergoes twisted deformation, the torsion shaft and the spool rotate together.

6. The webbing retractor of claim 4, further comprising a pretensioner mechanism set at the outer side of one of said side walls of the frame, wherein the retaining component is set between said one side wall of the frame and the pretensioner mechanism.

7. The webbing retractor of claim 6, wherein the retaining component is a gear case made from resin and the gear case covers one side of the lock gear.

8. The webbing retractor of claim 7, wherein a substantially board-shaped support component is formed at a diagonal lower portion of the gear case and said support hole is a circular support hole formed so as to penetrate through the support component.

9. The webbing retractor of claim 8, further comprising a lock component spanning between said opposing side walls of the frame and which is blocked from movement by a side wall of the frame.

10. The webbing retractor of claim 9, wherein the lock plate is integrally formed with one side end of the lock component.

11. The webbing retractor of claim 10, wherein the lock plate is arranged in a diagonal lower direction of the lock gear.

12. The webbing retractor of claim 8, further comprising a cover plate of metal fixed to the outer side of said one side wall of the frame where the retaining component is set, wherein the cover plate is open to a side surface and a lower surface.

13. The webbing retractor of claim 12, wherein the cover plate clamps the gear case at portions besides the support component.

14. The webbing retractor of claim 12, wherein the blocking component is integrally formed at a diagonal lower portion of the cover plate.

15. The webbing retractor of claim 14, wherein the blocking component is a planar blocking portion that is arranged at one side of the support component of the gear case.

* * * * *